No. 754,133. PATENTED MAR. 8, 1904.
E. R. GILL.
SYSTEM OF ALTERNATING CURRENT DISTRIBUTION.
APPLICATION FILED SEPT. 5, 1900.
NO MODEL. 3 SHEETS—SHEET 1.

Witnesses
Edward Rowland
James Spring

Edwin R. Gill
Inventor
By his Attorney
H. S. MacKaye

No. 754,133. PATENTED MAR. 8, 1904.
E. R. GILL.
SYSTEM OF ALTERNATING CURRENT DISTRIBUTION.
APPLICATION FILED SEPT. 5, 1900.
NO MODEL. 3 SHEETS—SHEET 2.

Witnesses
Edward C. Rowland
James L. King

Edwin R. Gill, Inventor
By his Attorney H. S. Mackaye

No. 754,133. PATENTED MAR. 8, 1904.
E. R. GILL.
SYSTEM OF ALTERNATING CURRENT DISTRIBUTION.
APPLICATION FILED SEPT. 5, 1900.
NO MODEL. 3 SHEETS—SHEET 3.

No. 754,133.

Patented March 8, 1904.

UNITED STATES PATENT OFFICE.

EDWIN R. GILL, OF NEW YORK, N. Y., ASSIGNOR TO INVENTION DEVELOPING COMPANY, A CORPORATION OF NEW JERSEY.

SYSTEM OF ALTERNATING-CURRENT DISTRIBUTION.

SPECIFICATION forming part of Letters Patent No. 754,133, dated March 8, 1904.

Application filed September 5, 1900. Serial No. 29,031. (No model.)

*To all whom it may concern:*

Be it known that I, EDWIN R. GILL, a citizen of the United States, residing in the city, county, and State of New York, have invented a certain new and useful Improvement in Systems of Alternating-Current Distribution, of which the following is a specification.

My present invention has relation to a system of electrical distribution whereby a single-phase main circuit is made available for supplying polyphase currents.

The principal object of my invention is the provision of means whereby the convenience of transmission and other advantages of single-phase circuits may be combined with the advantages incident to self-starting and efficient motors.

My invention will be found particularly useful in street-railway practice, since it involves the use of comparatively light and small accessory parts.

Figure 1:
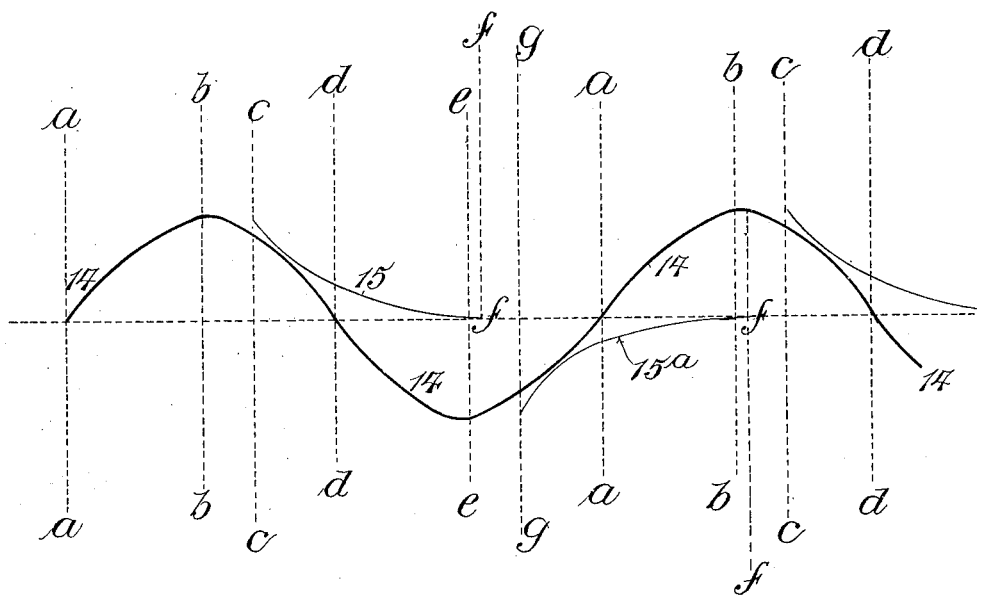
Figure 2:
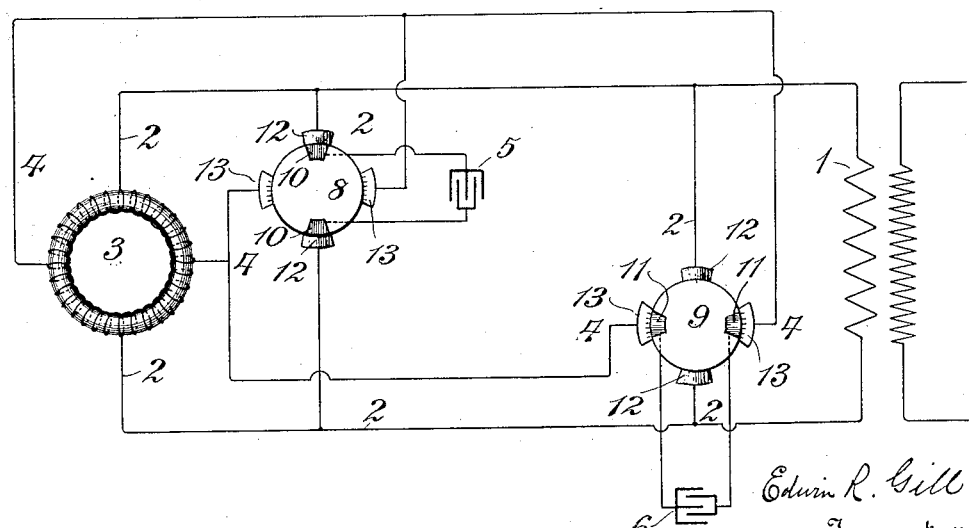
Figure 3:
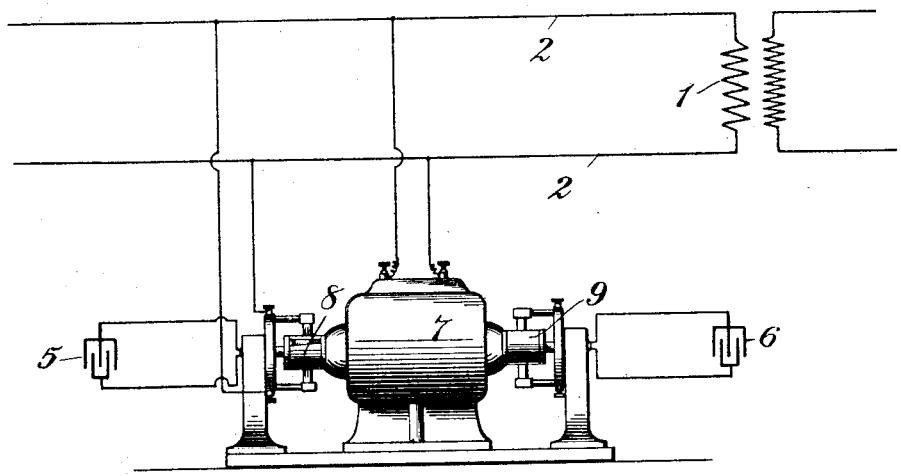
Figure 5:
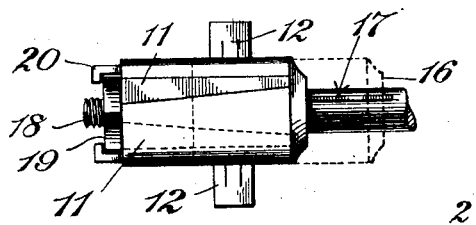
Figure 4:
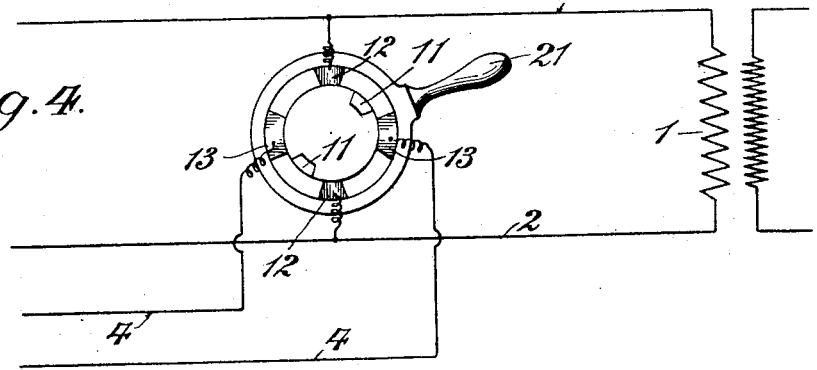
Figure 6:
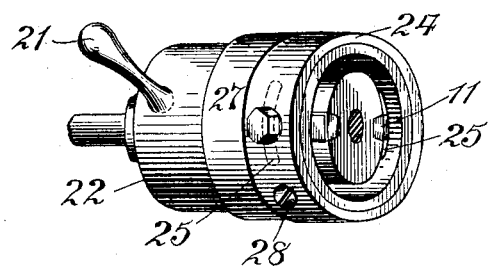
Figure 7:
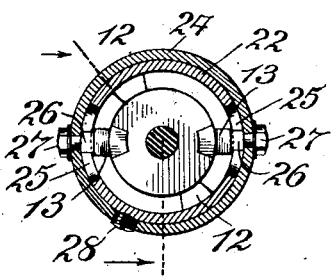
Figure 8:
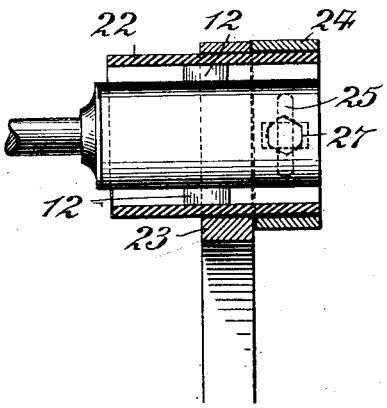
Figure 9:
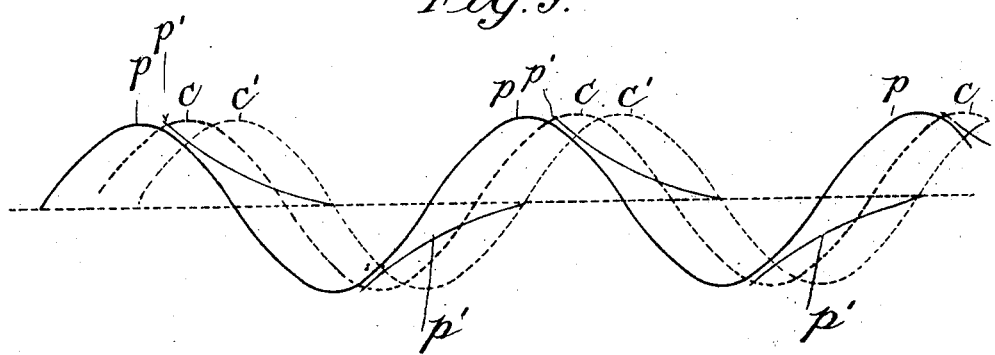

In the accompanying drawings, Figure 1 is a diagram of curves exemplifying the relations of time and electrical pressure set up in the main and auxiliary circuits employed in one form of my invention. Fig. 2 is a diagram exemplifying the electric connections employed in one form of my invention. Fig. 3 shows the preferred mode of operation of my charging and discharging commutators. Fig. 4 shows one mode of mounting the brushes for easy adjustment. Fig. 5 shows the preferred means for adjusting the length of time of contact with commutator-segments. Figs. 6, 7, and 8 are respectively a perspective, cross-section, and longitudinal section of phase-modifying adjustments; and Fig. 9 is a graphic diagram illustrating the pressure and current curves as produced by my present invention.

In the drawings any convenient source of single-phase alternating current is exemplified by the converter 1, to the secondary of which are connected the two ends of the main circuit 2.

At 3 is represented one member of any convenient polyphase translating device, the diagram showing in this instance the Gramme-ring winding of a two-phase motor. Two opposite points of this ring are connected with two sides of the main circuit 2, while the two ends of the auxiliary circuit 4 are connected to points on the ring 3 at right angles to the first-named connection.

At 5 and 6 are shown two condensers intended to be alternately charged from the main circuit 2 and discharged into the auxiliary circuit 4. The means preferably employed for this purpose are shown in Figs. 2 and 3.

The small auxiliary motor 7 is of the single-phase type and runs continuously in synchronism with the generator feeding the main circuit 2. This motor carries two commutators 8 and 9, having cylindrical non-conducting peripheries bearing two metallic segments 10 11. Each of these pairs of segments is permanently connected to the opposite plates of their respective condensers 5 and 6.

As shown in Fig. 2, the diameter joining segments 10 on commutator 8 is at right angles to that joining segments 11 on commutator 9. Each commutator is borne upon by four brushes. The opposite brushes 12 are connected to the main circuit 2, and the opposite brushes 13 are connected to the auxiliary circuit 4.

As best shown in Fig. 4, the brushes 13 are preferably made broader than the brushes 12 for a reason hereinafter explained.

In Fig. 1 the sinusoidal curve 14 illustrates the time and potential relations which may be assumed to exist on the main circuit 2, and the vertical dotted lines correspond to certain instants of time with relation to which certain circuit changes occur, as hereinafter described.

The operation of my system can now be explained by reference to Fig. 1 and the constructions above described. Assuming the auxiliary motor 7 to be running in synchronism and the commutators 8 and 9 to be properly set, the segments 10, for instance, will maintain connection with the main circuit through brushes 12, while the potential is rising from zero to a maximum on the main circuit. This corresponds to the time elapsing between lines *a* and *b* in Fig. 1. During this time the condenser has been receiving electricity under a constantly-rising potential, and just at the moment $b$ when the maximum potential is reached segments 10 leave the brushes 12 and the condenser remains stored. This condition lasts but for a moment of time, (represented by the distance between $b$ and $c$.) At the moment $c$ connection is made between segments 10 and the brushes 13 discharge of the condenser 5 into the auxiliary circuit 4 commences.

The curve 15 in Fig. 1 gives an approximate idea of the law governing the loss of electric pressure or potential between the plates in condenser 5 during its discharge. In a well-known manner, however, the self-induction of the motor-coils 3 will cause the current-curve to lag behind the pressure-curve shown, and the minimum or point of beginning will lie at $c$, the maximum somewhere between $c$ and $f$, and a new minimum at $f$. The point $f$ is chosen subsequent to the negative maximum $e$ and before the time $g$. During the time elapsing between the zero-point $d$ and the negative maximum $e$ on the main pressure-curve the segments 11 on the commutator 9 have been connected to brushes 12 and the condenser 6 has been negatively charged. This charge is maintained between $e$ and $g$, and at this latter moment the segments 11 touch the brushes 13 and the discharge of the condenser 6 into the auxiliary circuit commences. The curve $15^a$ exemplifies the resulting pressure-wave of discharge, and in the manner already described there will be formed a negative current-wave in the auxiliary circuit and motor coils. An illustration of the approximate relations between pressure and current waves in the main and auxiliary circuits is given in Fig. 9. Here the main-circuit pressure-wave is shown at $p$ and the condenser-discharge-pressure curves in the auxiliary circuit at $p'$. At $c$ is shown the main-circuit current-wave, or wave of effective potentials, lagging after the pressure-wave $p$. The current-wave in the auxiliary circuit is shown at $c'$.

The shape of the wave $c'$ will of course depend upon a variety of adjustable factors in the system, and the particular wave shown in the drawings is merely a type designed to make it clear that the main and the auxiliary current-waves $c$ and $c'$ are out of phase. This condition insures the production of a rotary magnetic field in the coils 3.

The curves of magnetic intensity resulting from the current-curves above illustrated can be regulated as to potential maximum and phase by well-known adjustments of self-induction and ohmic resistance factors, and the polyphase alternating currents produced by my system can thus be adapted to the most efficient conditions for power purposes.

It is to be understood that I am not limited to the employment of my polyphase currents in a single Gramme winding, as shown in the drawings, but that the two circuits 2 and 4 may feed independent coils when found desirable without departing from my invention. It is further to be understood that I am not limited necessarily to the use of a system employing two condensers. It is obvious that one condenser might be used in the manner heretofore described where it is desired to produce partial or fragmentary alternating impulses out of phase with alternating current of one phase. In my claims the term "periodic current" is not necessarily to be construed as meaning a complete and uninterrupted periodic flow.

Further means whereby the relative phases and shapes of waves may be modified in practice are shown in Figs. 5, 6, 7, and 8.

It will be found advisable in many cases to regulate the duration of time expended in the charge and discharge of each condenser. For this purpose a commutator may be used with metal segments tapering from end to end, as shown in Fig. 5. In the form shown the commutator is adapted to slide along the armature-shaft, as indicated by the dotted lines 16, while it is prevented from all rotation relative to the shaft by the spline 17 in a well-known manner. The longitudinal adjustment may be accomplished in a variety of ways, which will readily occur to those skilled in this art. In the drawings I have indicated a screw-thread upon the end of the shaft at 18, upon which turns a nut 19, confined between the commutator and appropriate hooks 20. By turning the nut one way or the other the commutator may be moved longitudinally and different widths of segment 11 may thus be brought under the stationary brushes 12, for instance. By this operation the duration of contact is regulated and the condenser charge controlled.

Obviously the desired end may be attained by any means which causes a change of relative position longitudinally between the brushes and the commutator-segments, whether this be accomplished by shifting the brushes or the commutator.

My invention is not limited to either mode of adjustment exclusively.

Another adjustment frequently desirable for my system is a change in relative circumferential position of the brushes 12 and 13. In Fig. 4 these brushes are at the extremities of diameters ninety degrees apart and are supported upon a ring capable of adjustment by the handle 21. This only permits simultaneous rotation of both sets of brushes for elimination of sparking. In Figs. 6, 7, and 8, on the other hand, means are shown whereby the angle between the brushes may be varied, while at the same time permitting the adjustment provided for by the construction shown in Fig. 4. Here the main brush-holding ring 22, supported, for instance, by the collar 23, carries a supplemental ring 24, capable of turning upon one portion of said main ring. Beneath the supplemental ring are the slots 25 in the ring 22, diametrically placed, and through these pass the stems 26 of the brushes 13. The outer ends of the stems 26 pass through holes in the ring 24, and upon their extremities are screwed securing-nuts 27. By loosening the bearing-screw 28 the ring 24 may be turned and the brushes slid around the commutator through a considerable arc of adjustment. The oblique relation between the brushes 12 and 13 in Fig. 7 illustrates this. In this construction the brushes 12 are supported directly by the ring 22. Other constructions may be used whereby to obtain this adjustment without departing from the spirit of my invention, and it is further clear that my system may be used with one or all the adjustments above described, as desired.

By duplicating the main elements of my invention herein shown and described those skilled in the art will be enabled to adapt the system to the production of more than two phases from a single-phase circuit.

The advantages possessed by my system over those hitherto devised for the same purpose lie in the fact that relatively light and easily-handled condensers are substituted for heavy machinery, and it is clear that by increasing the rapidity of alternations in the main circuit relatively small condensers can be made to answer in a given case.

What I claim is—

1. As a means for producing auxiliary current-waves out of phase with an original single-phase current in a main circuit, an auxiliary circuit having a self-induction approximately equal to that of said main circuit, a condenser and means for alternately charging said condenser from said main circuit during rise of potential in said circuit, and discharging said condenser into said auxiliary circuit, whereby said main and auxiliary circuits are made to carry periodic currents of different phases and common periodicity.

2. As a means for producing polyphase currents, a source of single-phase alternating current, a main circuit fed thereby, an auxiliary circuit, two condensers and means for charging said condensers alternately with opposite potentials during increase of the respective opposite potentials in said main circuit, and alternately discharging said condensers between charges into said auxiliary circuit, whereby said main and auxiliary circuits are made to carry periodic currents of different phases and common periodicity.

3. As a means for producing polyphase currents, a source of single-phase alternating current, a main circuit fed thereby, an auxiliary circuit, two condensers, a synchronous motor operated by said main circuit, and two commutators operated by said motor, each operating to alternately charge one of said condensers from the main circuit and discharge it into the auxiliary circuit, whereby said main and auxiliary circuits are made to carry periodic currents of different phases and common periodicity.

4. In a means for alternately charging and discharging condensers, a rotary commutator carrying two sets of independent isolated conducting-sections tapering longitudinally, two separate sets of brushes bearing respectively on said segments and means for adjusting the relative longitudinal positions of both said sets of brushes simultaneously, with respect to the said segments.

5. In a means for alternately charging and discharging a condenser, a rotary commutator, a rotary carrier and two pairs of brushes borne on said carrier, said pairs of brushes being located in separate planes and bearing on said commutator; in combination with means for adjusting the relative angular positions of said brushes pair to pair.

6. As a means for producing polyphase currents, a source of single-phase alternating current, a main circuit fed thereby, a synchronous motor in said main circuit, an auxiliary circuit independent of said synchronous motor, a condenser and means for alternately charging said condenser from said main circuit during rise of potential in said circuit and discharging said condenser into said auxiliary circuit, whereby said main and auxiliary circuits are made to carry periodic currents of different phases and common periodicity.

EDWIN R. GILL.

Witnesses:
SOPHIE A. COSTA,
JAMES S. LAING.